(No Model.)
W. I. WINNE.
FASTENING DEVICE FOR HORSE BLANKETS.
No. 314,902. Patented Mar. 31, 1885.
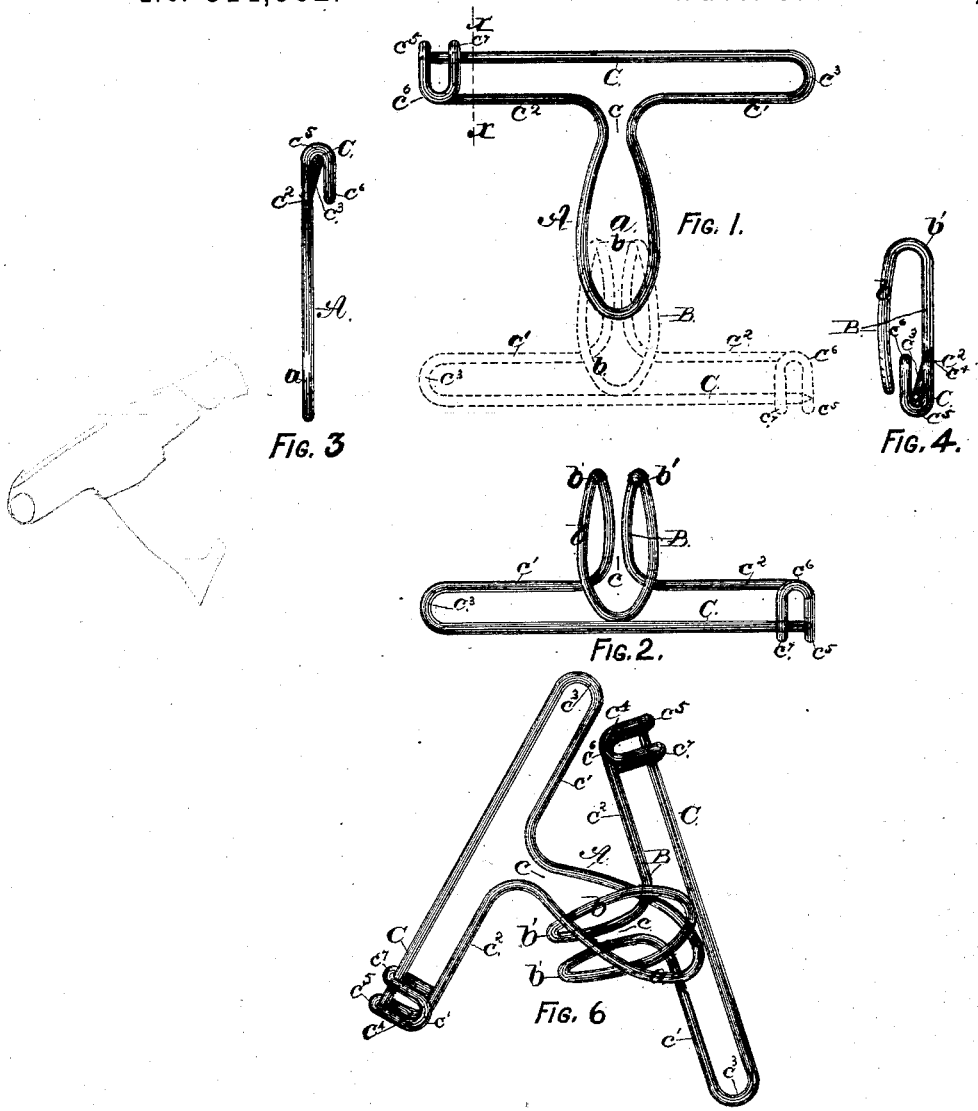
Witnesses:
S. B. Brewer
E. I. Low
Inventor:
WILLIAM I. WINNE,
by William K. Low,
Attorney.

UNITED STATES PATENT OFFICE.

WILLIAM I. WINNE, OF ALBANY, ASSIGNOR OF ONE-HALF TO JAMES GODWIN, OF NEW YORK, N. Y.

FASTENING DEVICE FOR HORSE-BLANKETS.

SPECIFICATION forming part of Letters Patent No. 314,902, dated March 31, 1885.

Application filed September 13, 1884. (No model.)

*To all whom it may concern:*

Be it known that I, WILLIAM I. WINNE, of the city and county of Albany, in the State of New York, have invented a new and useful Fastening Device for Horse-Blankets and other Similar Purposes, of which the following is a specification.

My invention consists of a hook and eye constructed, as herein described, in such manner that the two parts cannot be disengaged from each other by means of pressure applied in a direction of the center lines of said hook and eye; and the object of my invention is to provide a safe, cheap, and simple fastening for horse-blankets which cannot be accidentally disengaged by any rubbing or contortive movement of the animal. This object I attain by means of the construction illustrated in the accompanying drawings, which, being herein referred to, forms part of this specification, and in which—

Figure 1 is a plan view of the eye-piece of my fastening; Fig. 2, a plan view of the hook-piece. Figs. 3 and 4 are respectively end elevations of said eye-piece and hook-piece; Fig. 5, a transverse section of Fig. 1 at the line $x\ x$, and Fig. 6 a plan view of the eye-piece and hook-piece arranged in their relative positions during the operations of engaging and disengaging them.

As represented in the drawings, A is the eye-piece of the fastening; B, the hook-piece of same, and C a "safety-pin" formed on each eye-piece and hook-piece for the purpose of attaching them to blankets.

The eye-piece A and hook-piece B are both preferably formed of spring-wire, substantially in the form shown. The eye-piece A is provided with an eye, $a$, made in the form of an elongated loop, and the hook-piece B is provided with a hook, $b$, made in the form of an open loop, which is bent back, as at $b'$, so as to overlie the body of said hook-piece. The hook $b$ is formed in such manner that its greatest outside width will exceed the greatest transverse diameter of the opening in the eye $a$, and so that said hook cannot be inserted in or removed from the eye $a$, while the center lines of the hook and eye are ranged in direct line with each other—that is to say, while the two parts are in the relative positions indicated by the full and dotted lines of Fig. 1. After forming the eye $a$ or the hook $b$, the wire in either piece is bent to form a contracted throat, $c$, and then the parts $c'$ and $c^2$ are bent laterally in opposite directions. The part $c'$ is given a return bend at $c^3$, and its extension forms a sharp-pointed pin, C, for the safety-pin. The part $c^2$ is first bent downward, as at $c^4$, then bent forward and upward, as at $c^5$, then bent sidewise and downward, as at $c^6$, and then bent rearward and upward, as at $c^7$, so as to leave the upturned end on the same plane with and covered by the part $c^2$.

The parts $c^4$, $c^5$, $c^6$, and $c^7$ form a gutter-like protecting-shield for the point of the pin C, and prevents said pin from inflicting any injury to the animal covered by the blanket.

In the operation of engaging and disengaging the hook and eye, the eye-piece A and hook-piece B should be fixed in the angular positions shown in Fig. 6, with the point of the hook $b$ inserted in the opening of the eye $a$. Then by moving the hook in the direction of its own center line the engagement or disengagement of the two parts can be readily effected; but under no other conditions can the separation of the hook from the eye ever be accomplished, and for that reason all danger of an accidental displacement of the blanket is avoided.

The hook and eye of my fastening device are herein shown and described as being provided with a safety-pin as affording a ready and safe means of attaching and adjusting the parts in place on a horse-blanket; but when preferred the safety-pin feature may be dispensed with and the loops commonly formed on the ordinary hook and eye may be substituted therefor.

I claim as my invention—

A fastening device composed of the eye-piece A, provided with the eye $a$, and the hook-piece B, as shown, provided with the hook $b$, as herein described, the eye-piece A and hook-piece B being each provided with the fastening-pin C, the greatest external width of the hook $b$ exceeding the greatest transverse diameter of the opening of the eye $a$, as and for the purpose herein specified.

WILLIAM I. WINNE.

Witnesses:
 WM. H. LOW,
 S. B. BREWER.